US010162356B2

United States Patent
Rao

(10) Patent No.: US 10,162,356 B2
(45) Date of Patent: Dec. 25, 2018

(54) PATH SELECTION FOR AUTONOMOUS VEHICLES

(71) Applicant: Futurewei Technologies, Inc., Plano, TX (US)

(72) Inventor: Lei Rao, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 18 days.

(21) Appl. No.: 15/379,979

(22) Filed: Dec. 15, 2016

(65) Prior Publication Data
US 2018/0174451 A1 Jun. 21, 2018

(51) Int. Cl.
- G05D 1/00 (2006.01)
- G08G 1/01 (2006.01)
- G01C 21/34 (2006.01)
- G08G 1/0968 (2006.01)

(52) U.S. Cl.
CPC ....... G05D 1/0088 (2013.01); G01C 21/3461 (2013.01); G08G 1/0112 (2013.01); G08G 1/0133 (2013.01); G08G 1/0141 (2013.01); G08G 1/096827 (2013.01); G08G 1/096844 (2013.01)

(58) Field of Classification Search
CPC .......... G08G 1/096716; G08G 1/0112; G01C 21/3461; G05D 1/0088
See application file for complete search history.

(56) References Cited

U.S. PATENT DOCUMENTS

| 2015/0168169 A1* | 6/2015 | Caceres ............ G01C 21/3492 701/537 |
| 2016/0305787 A1* | 10/2016 | Sato ...................... G05D 1/0088 |
| 2017/0262790 A1* | 9/2017 | Khasis ............... G01C 21/3461 |

OTHER PUBLICATIONS

Charrow, B. et al., "Information-Theoretic Planning with Trajectory Optimization for Dense 3D Mapping," Proceedings of Robotics: Science and Systems. 2015. 10 pages.
Currier, Patrick N., "A Method for Modeling and Prediction of Ground Vehicle Dynamics and Stability in Autonomous Systems," Ph.D. dissertation submitted to the faculty of the Virginia Polytechnic Institute and State University, May 6, 2011, 229 pages.

* cited by examiner

*Primary Examiner* — Aaron L Troost
(74) *Attorney, Agent, or Firm* — Futurewei Technologies, Inc.

(57) ABSTRACT

According to a method for selecting a path, the vehicle may receive driving condition of an area from a server, where the driving condition indicates that the area comprises a trouble area. Based on the driving condition of the area, the vehicle may calculate a first path and a second path, each of which is from a first point to a second point. The vehicle may obtain an effect value on vehicle driving associated with a change of weather. Based on the effect value and some other information, the vehicle may calculate a first weighted value for the first path and a second weighted value for the second path. Based on the first weighted value and the second weighted value, the vehicle may select a path. Because the effect value is used to select a path, the path selection in this embodiment may be associated with the change of weather.

16 Claims, 8 Drawing Sheets

300

400 ns with the memory. The pro-
PATH SELECTION FOR AUTONOMOUS VEHICLES

BACKGROUND

An autonomous vehicle (autonomous car, driverless car, self-driving car, robotic car) is a vehicle that is capable of sensing its environment and navigating without human input.

Autonomous cars can detect surroundings using a variety of techniques such as radar, lidar, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination. One of the most important technologies for autonomous car is how to automatically select a proper path by the autonomous car for itself.

SUMMARY

In one embodiment, the disclosure includes a method for selecting a path by a vehicle. According to this method, the vehicle may receive driving condition of an area from a server, wherein the driving condition indicates that the area comprises a trouble area. Based on the driving condition of the area, the vehicle may calculate a first path and a second path, each of which is from a first point to a second point. The vehicle may further obtain a first condition change value of the first path and a second condition change value of the second path, and calculate a first distance value between the first path and the trouble area and a second distance value between the second path and the trouble area. Moreover, the vehicle may obtain an effect value on vehicle driving associated with (or caused by) a change of weather. Based on the first condition change value, the first distance and the effect value, the vehicle may calculate a first weighted value. Based on the second condition change value, the second distance and the effect value, the vehicle may calculate a second weighted value. Based on the first weighted value and the second weighted value, the vehicle may select a path. Because the effect value is used to select a path, the path selection in this embodiment may be associated with the change of weather.

In some examples, when the effect value indicates that the weather is changing to a worse condition for driving a vehicle, weight of the first distance value decreases for determining the first weighted value, and weight of the second distance value decreases for determining the second weighted value. When the weight of the first distance value and the weight second distance value decrease, it means that the weight of the first condition change value and the weight of the second condition change value increase. Between the first and second paths, the one having a larger condition change value is more possible to be selected. When the vehicle drives on such a selected path, the vehicle may measure more uncertainty than driving a path having smaller condition change value. In some examples, the path having a larger condition change value is closer to the trouble area than the path having a smaller condition change value.

In one embodiment, the disclosure includes a vehicle comprising a plurality of wheels, one or more engines, and a control mechanism where the control mechanism comprises a non-transitory memory comprising instructions; and a processor in communications with the memory. The processor is configured to execute the instructions to: receive driving condition of an area from a server, where the driving condition indicates that the area comprises a trouble area; calculate a first path and a second path based on the driving condition of the area, each of which is from a first point to a second point; obtain a first condition change value of the first path and a second condition change value of the second path; calculate a first distance value between the first path and the trouble area and a second distance value between the second path and the trouble area; obtain an effect value on vehicle driving associated with a change of weather; calculate a first weighted value based on the first condition change value, the first distance and the effect value; calculate a second weighted value based on the second condition change value, the second distance and the effect value; and select a path based on the first weighted value and the second weighted value. Based on the first weighted value and the second weighted value, the vehicle may select a path. Because the effect value is used to select a path, the vehicle may select a path associated with the change of weather.

In some examples, when the effect value indicates that the weather is changing to a worse condition for driving a vehicle, weight of the first distance value decreases for determining the first weighted value, and weight of the second distance value decreases for determining the second weighted value. When the weight of the first distance value and the weight second distance value decrease, it means that the weight of the first condition change value and the weight of the second condition change value increase. Between the first and second paths, the one having a larger condition change value is more possible to be selected. When the vehicle drives on such a selected path, the vehicle may measure more uncertainty than driving a path having smaller condition change value. In some examples, the path having a larger condition change value is closer to the trouble area than the path having a smaller condition change value.

In some embodiments, vehicle may select a proper path according to the change of weather to effectively measure the driving condition of the path.

In one embodiment, the disclosure includes a server. The server comprises a non-transitory memory comprising instructions; and a processor in communication with the memory. The processor is configured to execute the instructions to: send driving condition of an area to a vehicle, where the driving condition indicates that the area comprises a trouble area; calculate an effect value based on weather information, where the effect value is associated with a change of weather; send the effect value to the vehicle; receive driving condition of a plurality of points in the area from the vehicle; and updating the driving condition of the area based on received the driving condition of the plurality of points.

In some examples, the effect value increases when the weather becomes better for driving the vehicle and the effect value decreases when the weather becomes worse for driving the vehicle.

In some embodiments, the server may send the effect value associated with the change of weather to the vehicle, so that the vehicle may select a proper path according to the change of weather to effectively measure the driving condition of the path.

BRIEF DESCRIPTION OF THE DRAWINGS

For a more complete understanding of this disclosure, reference is now made to the following brief description.

DETAILED DESCRIPTION

Figure 1:
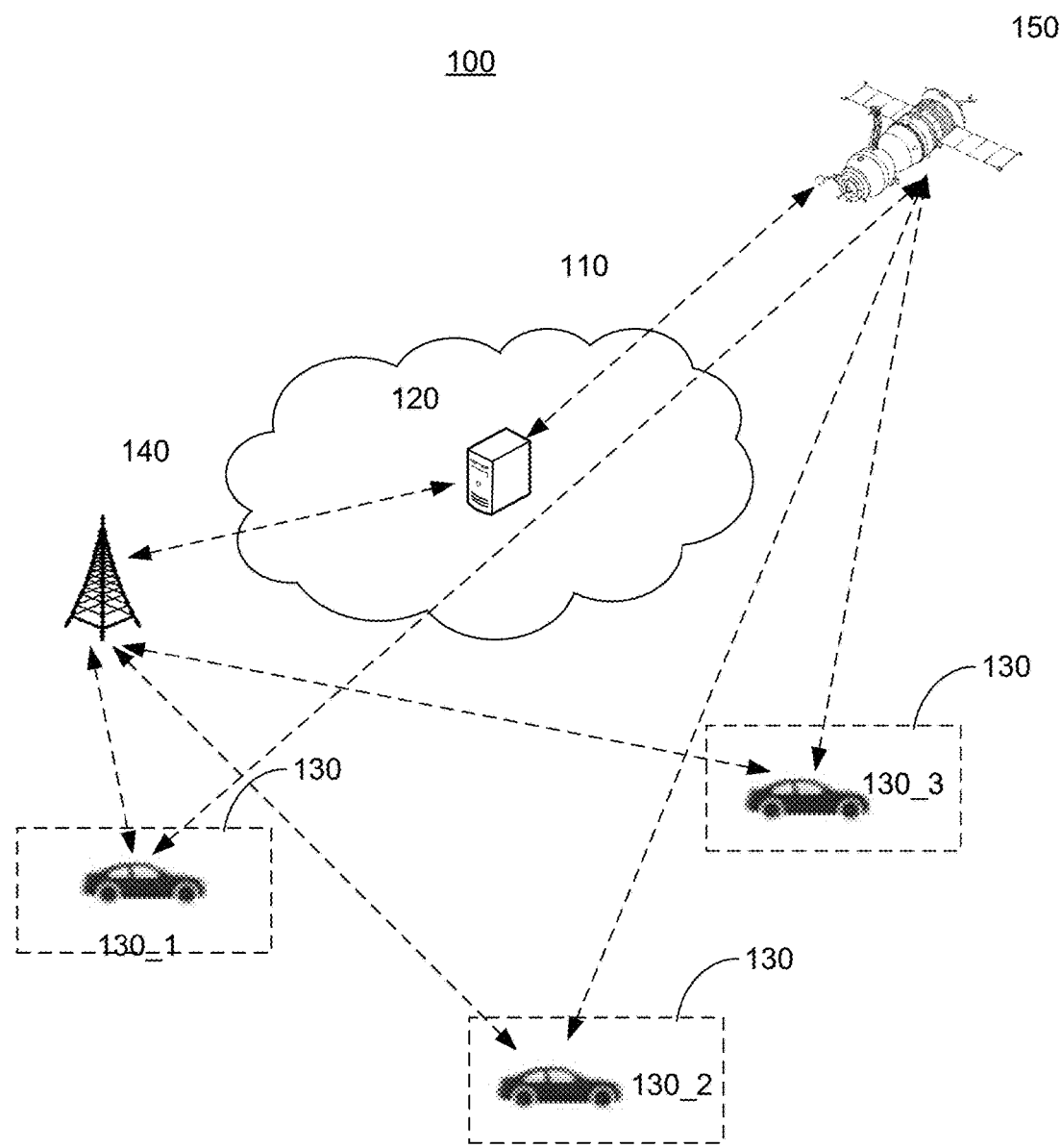
FIG. 1 is a schematic diagram of a system according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In one embodiment, a vehicle may receive autonomous driving control information, such as an area map and a weather factor for an area in the vicinity of where the vehicle is currently located or traveling. The driving control information may be received from a server or a cloud service. The area map can identify driving conditions including trouble spots in the area. In one embodiment, the area map can indicate a degree of uncertainty on the driving conditions in the area. Future measureable driving conditions by a vehicle along a path in the area may correspond or contribute to an information gain to reduce the degree of uncertainty of the driving conditions indicated in the area map. In one embodiment, a distance measure of a path can represent a degree of separation between the path and the trouble spots which may be known to a certainty or to a certain degree of certainty.

The vehicle may plan (e.g. based on a processing unit configured in the vehicle) a path in the area towards a destination based on the received area map and the weather factor. For example, the vehicle may identify multiple candidate paths in the area map for the vehicle to reach the destination location from a current location of the vehicle. Each candidate path may be associated with a respective information gain for a potential reduction of the existing uncertainty of driving conditions in the area map when the candidate path is actually travelled. Each candidate path may also be associated with a respective distance measure representing the separation to the known trouble spots in the vicinity of the area.

The vehicle may select one path from the candidate paths based on a weighted combination of the associated information gain and distance measure weighted by the weather factor. In one embodiment, the weather factor may be inversely associated with a severity of weather conditions in the area to favor more information gain as weather conditions deteriorates. For example, if driving conditions in the area map are known with certainty, no candidate path would contribute to any information gain and the path selected will be based solely on the separation from the trouble spots. On the other hand, when weather deteriorates with unclear driving conditions, more weight would be placed to select a path traversing through driving conditions known with less certainty (or less information) than other candidate paths.

In one embodiment, the vehicle may generate a set of controls or signals to drive the mechanical engines to move the vehicle from its current location along the selected path towards the destination. The vehicle may sense or detect actual driving conditions along the selected path traveled. Measurements of the detected actual driving conditions may be dynamically sent to a server or a cloud service while the vehicle is driving along the selected path. As a result, information or updates on information on driving conditions in the area may be shared among multiple vehicles in a distributed manner.

FIG. 1 illustrates a schematic diagram of a system 100 according to an embodiment of the disclosure. Network 100 may include a network 110 including a server 120 and autonomous vehicles 130, such as vehicles 130_1, 130_2 and 130_3. Autonomous vehicles 130 may have communicative connections with server 120 in network 110. In some embodiments, the connections may be established via a base station 140 or a satellite 150. Each of autonomous vehicles 130 may send base station 140 or satellite 150 the information destined for server 120 in network 110, so that base station 140 or satellite 150 may forward the information received from autonomous vehicles to server 120. Conversely, server 120 in network 110 may send base station 140 or satellite 150 the information destined for autonomous vehicles 130, so that base station 140 or satellite 150 may forward the information to autonomous vehicles 130.

Each of autonomous vehicles 130 may have a vehicle chassis, a plurality of wheels and one or more engines powered by gasoline, diesel and/or electricity. Furthermore, each of the autonomous vehicles 130 may have a control mechanism including a processor, a memory storing computer-readable instructions and a communication unit to communicate with server 120 in network 110. In some embodiments, vehicle 130 may have a steering wheel, while in some other embodiments vehicle 130 may not have a steering wheel. The processor may send, via the communication unit, some traffic (or driving condition) information detected by autonomous vehicle 130 to server 120 so that server 120 may update a database based on the received traffic information.

The processor may receive information from the server and control mechanical movements to enable self-driving of autonomous vehicle 130 based on the received information. In some embodiments, the information may be applied to identify multiple alternative paths between two locations or to reach a common destination from a current location of the vehicle, the boundaries of trouble areas, such as slipping areas, close to the alternative paths and/or weather information or condition associated with where the vehicle is currently travelling. The communication unit may have a hardware antenna for communicating with base station 140 and/or satellite 150. In some embodiments, the communication unit may be a Global System for Mobile communication (GSM) unit, a Code Division Multiple Access (CDMA) unit, a Wideband Code Division Multiple Access (WCDMA) unit, a CDMA 2000unit, a Long Term Evolution (LTE) unit and/or a satellite communication unit.

The network 100 may or may not be based on cloud computing. In some embodiments, the network 100 may include Internet Protocol (IP) switches and/or routers. In some embodiments, the network 100 may include SDN switches and SDN controllers.

Figure 1A:
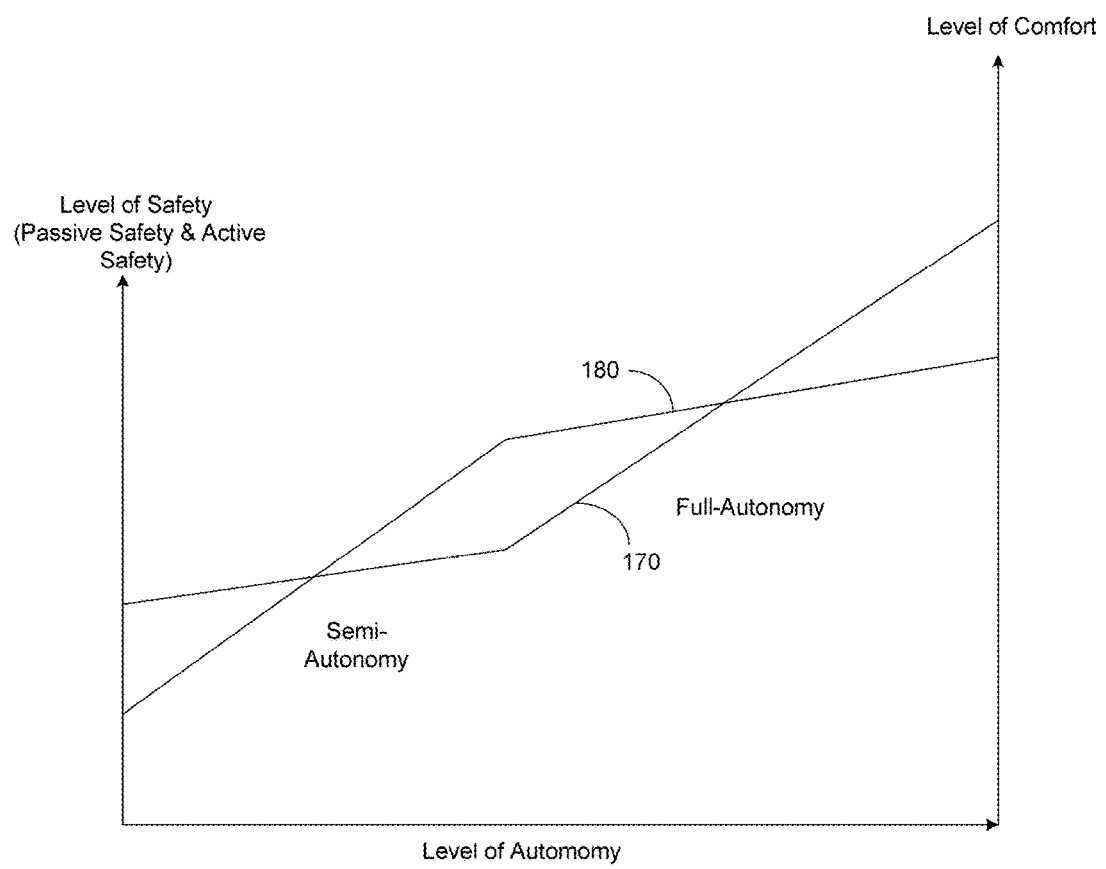
FIG. 1A is a diagram of development of safety and comfort associated with autonomous driving according to the disclosure.

FIG. 1A is a diagram of development of safety and comfort associated with autonomous driving according to the disclosure. FIG. 1A may illustrate a trend of adoption of autonomous driving. As shown, the development of level of safety is indicated by line 170 and the development of level of comfort is indicated by line 180. According to FIG. 1A, with the increase of level of autonomy, both the level of safety and the level of comfort increase. When the level of autonomy is within semi-autonomy, the increase rate of the level of safety is higher than the increase rate of the level of comfort. When the level of autonomy is within full-autonomy, the increase rate of the level of comfort is higher than the increase rate of level of safety. Based on FIG. A1, full-autonomy has more advantages than semi-autonomy.

Figure 1B:
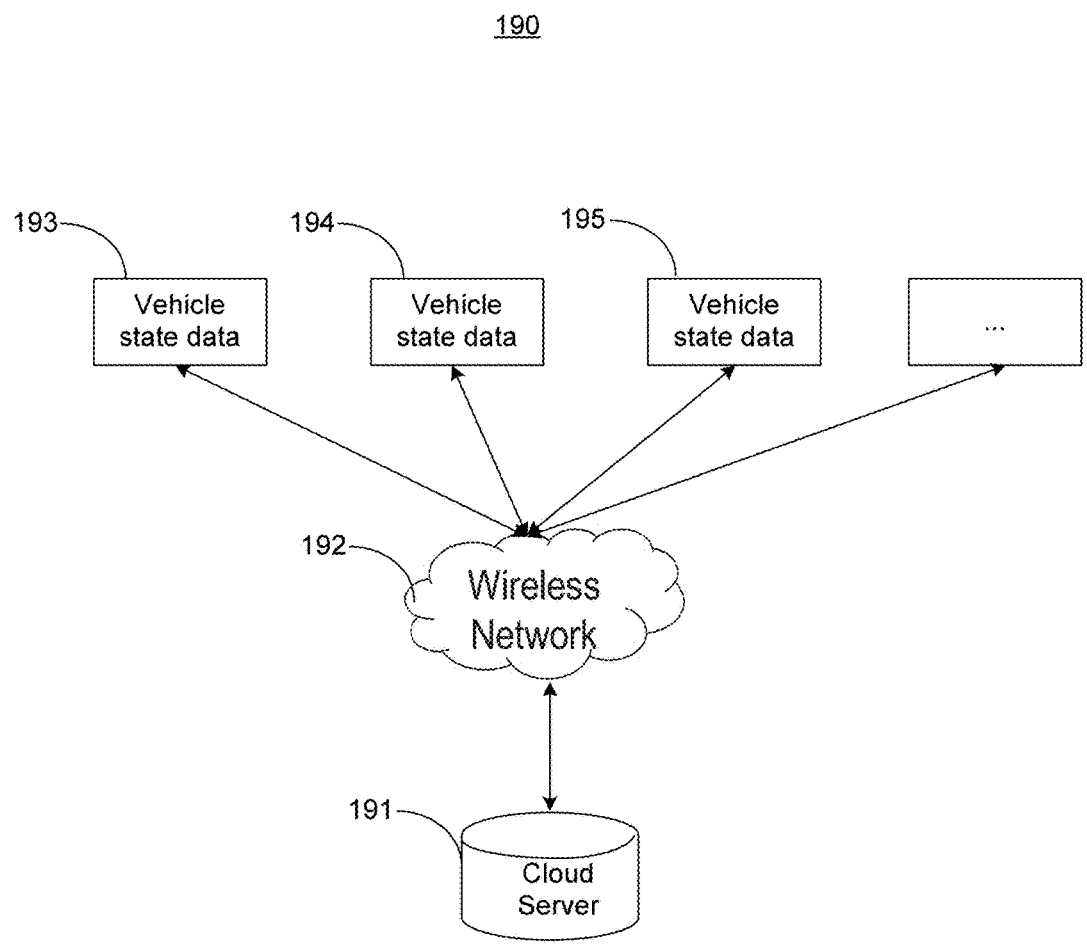
FIG. 1B is a schematic diagram of a network system according to an embodiment of the disclosure.

FIG. 1B is a schematic diagram of a network system 190 according to an embodiment of the disclosure. Network system 190 may include cloud server 191, wireless network 192, vehicle state data 193 of a first vehicle, vehicle state data 194 of a second vehicle, vehicle state data 195 of a third vehicle, and/or other state data. Vehicle stat data of a vehicle may include geographic location of the vehicle, the speed of the vehicle, the direction of the movement of the vehicle, the slipping information associated with road or other driving conditions detected or measured by the vehicle. In some embodiments, the vehicle state data may be received and stored in the cloud server 191.

Figure 2:
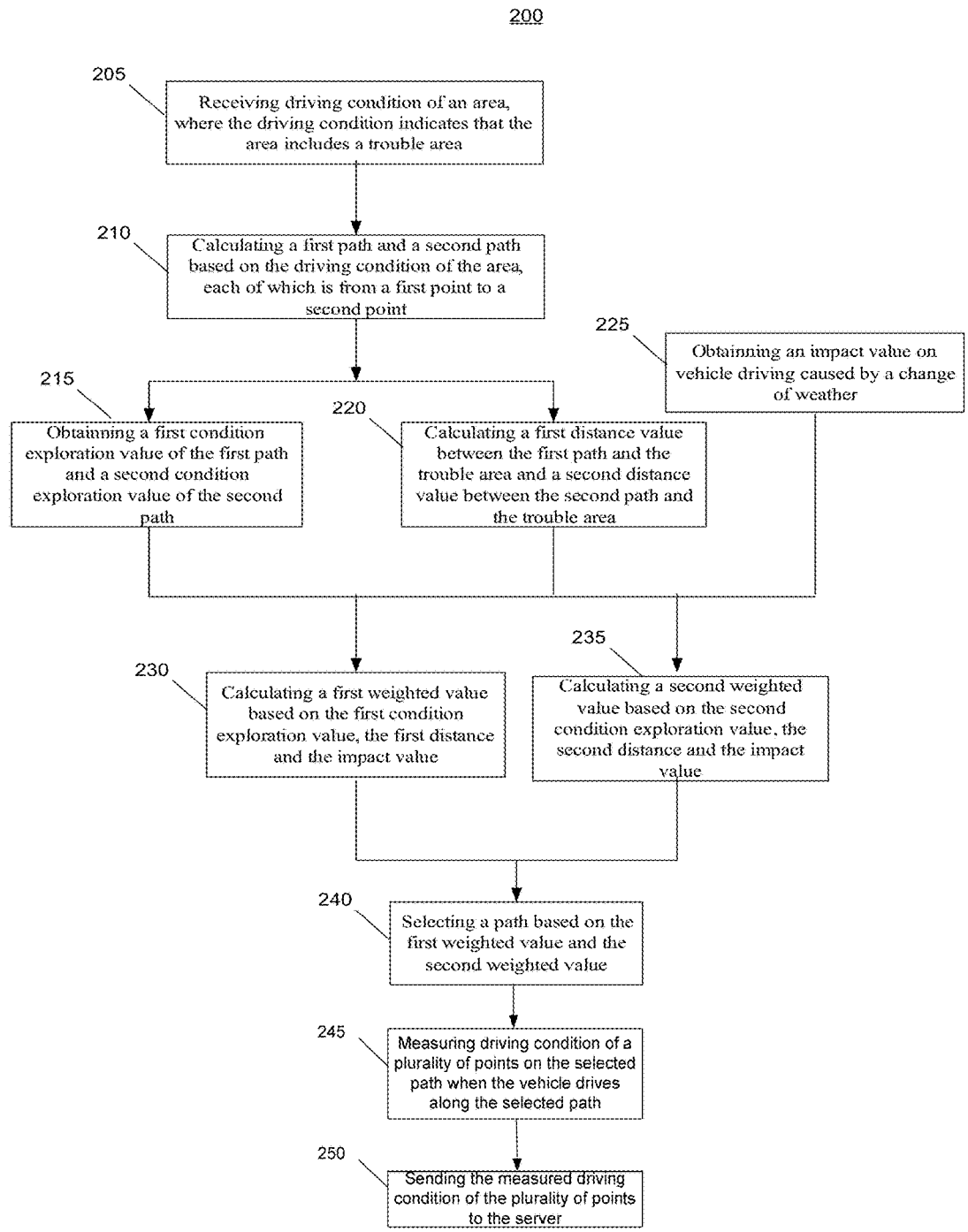
FIG. 2 is a flow chart of a method for selecting path according to an embodiment of the disclosure.

FIG. 2 is a flow chart of a method 200 for selecting path according to an embodiment of the disclosure.

At operation 205, a vehicle may receive a driving condition of an area from a server, where the driving condition indicates that the area comprises a trouble area.

In some embodiments, the vehicle may be any vehicle as illustrated in FIG. 1, such as vehicle 130_1, 130_2 or 130_3. In some embodiments, the vehicle may receive a map of the area from the server. The map can include driving conditions and/or levels of uncertainties about the driving conditions of the area that the vehicle is about to travel through. In some embodiments, the vehicle may have a pre-configured map. The vehicle may receive real-time updates on the pre-configured map from the server. In some embodiments, the map can indicate where the trouble area is located. In some embodiments, the vehicle may receive the location information of the trouble area without the map of the area and then combine the location information of the trouble area with a pre-configured map of the area in the vehicle.

In some embodiments, the trouble area may represent a sub-area of the area, where the sub-area may be covered with some water, ice, snow, oil and/or sands, having uneven road surfaces, or with unfinished roads under construction. In some embodiments, the map received from the server may include geographical location information associated with the trouble area, such as the geographical location information associated with the boundary of the trouble area. A trouble area may include one or more multiple trouble spots or one or more multiple non-contiguous trouble regions. In some embodiments, the driving condition of the area may have uncertainty because the weather is always changing, making the driving condition changes correspondingly.

At operation 210, the vehicle may calculate a first path and a second path based on the driving condition of the area, each of which is from a first point to a second point.

Identifying a path between two geographic locations (e.g. the first path and the second path) may be performed based on well known techniques such as Shortest Path Routing, Multi-objective Routing, Dynamic Programming and Model Predictive Control based Planning, or other applicable algorithms.

At operation 215, the vehicle may obtain a first condition change value of the first path and a second condition change value of the second path.

In some embodiments, with respect to a path obtained at operation 210, such as the first path or the second path, the vehicle may determine a plurality of points on the path. Furthermore, the vehicle may further calculate expected driving condition (or road conditions) of the plurality of points. In some embodiments, driving condition of a point may refer to whether the point is slipping and/or uneven, or whether the point is good for driving or moving a vehicle. In some embodiments the driving condition of the point may further include the slipping level and/or uneven level.

Moreover, the vehicle may obtain condition change value of the plurality points based on the expected driving condition of the plurality points in different ways. In some embodiments, the vehicle may send the expected driving condition (or detected actual driving conditions) of the plurality of points to the server. The server may have old driving condition of the plurality of points reported by vehicles which passed the plurality of points within previous a time period. The server may determine condition change values of the plurality of points based on the expected driving condition of the plurality of points and the old driving condition of the plurality of points. For example, the condition change values of the plurality of points may be determined based on the difference between the expected driving condition of the plurality of points and the old driving condition of the plurality of points. Based on the condition change values of the plurality of points, the server may determine the condition change value of the path comprising the plurality of points. For example, the server may take the sum of the condition change values of the plurality of points as the condition change value of the path including the plurality of points. The server may further send the condition change value of the path to the vehicle.

In some embodiments, the vehicle may receive the old driving condition of the plurality of points from the server. Furthermore, the vehicle may determine the condition change values of the plurality of points based on the expected driving condition of the plurality of points and the old driving condition of the plurality of points. Moreover, the vehicle may determine the condition change value of the path based on the condition change values of the plurality of points. The condition change values may be associated with a change of uncertainty in information associated with driving conditions in an area maintained in the server.

At operation 220, the vehicle may calculate a first distance value between the first path and the trouble area and a second distance value between the second path and the trouble area.

In some embodiments, when the distance between a path and the trouble area is shorter than a security threshold, the path will be excluded from path selection. In other words, if a path is considered as being dangerous, the vehicle won't move along the path.

At operation 225, the vehicle may obtain an effect value on vehicle driving associated with a change of weather.

In some embodiments, the vehicle may obtain one or more weather parameters via the wireless communicative connection with weather information provider, such as the server providing information associated with the trouble area. In some embodiments, the weather parameters may also be detected by the vehicle itself via a weather detector equipped on the vehicle. The effect value may be associated with the situation that whether the weather is changing to a better condition (e.g. represented by a level of severity of weather conditions in the related area) for driving a vehicle or changing to a worse condition for driving a vehicle. When the weather is changing to a better condition, the effect value may increase; when the weather is changing to a worse condition, the effect value may decrease.

The vehicle may determine the change of weather based on weather parameters received at different time instants. For example, when the vehicle receives current weather parameters and previous weather parameters, the vehicle may determine whether the weather is changing to a better condition for driving a vehicle or changing to a worse condition for driving a vehicle. The current weather parameters may include the latest or newest weather parameters on or near the geographic location where the vehicle currently is. In some embodiments, the previous weather parameters may be the weather parameters on the geographic location where the vehicle was some time ago. In some embodiments, the previous weather parameters may be old weather parameters on the geographic location where the vehicle currently is.

In some embodiments, the vehicle may receive the effect value on vehicle driving associated with the change of weather from the server. The server may use the above method used by vehicle to determine the effect value.

At operation 230, the vehicle may calculate a first weighted value based on the first condition change value, the first distance and the effect value. The first weighted value is associated with the first path. The effect value determined at operation 225 may be used to adjust the weight of the first condition change value and the weight of the first distance.

In some embodiments, when the weather is changing to a better condition for vehicle driving, the associated effect value may result in an increase of the weight of the distance between a path and a trouble area in path selection, and a decrease of the weight of the condition change value associated with the path in the path selection. In some embodiments, any increase or decrease may represent comparative increase or decrease. In some embodiments, a path far from the trouble area has higher possibility to be selected when the weather is changing to a better condition for vehicle driving. When the weather is changing to a worse condition for vehicle driving, the associated effect value may decrease the weight of the distance between the path and the trouble area and increase the weight of the condition change value associated with the path. Consequently, a path close to the trouble area has higher possibility to be selected.

In some embodiments, calculating a weighted value for a path may be based on the following expression:

$V_x = E_x + \alpha D_x$, where $V_x$ is the weighted value of path x, $E_x$ is the condition change value of path x, and $\alpha$ is associated with the effect value.

When the effect value indicates the weather becomes better for driving, the value of $\alpha$ (e.g. a weather factor) may increase. The increase of $\alpha$ causes that the comparative weight of $D_x$ increases and the comparative weight of $E_x$ decreases.

When the effect value indicates the weather becomes worse for driving, the value of $\alpha$ may decreases. The decrease of $\alpha$ causes that the comparative weight of $D_x$ decreases and the comparative weight of $E_x$ increases.

In some embodiments, the path or trajectory may be planned for a vehicle according to a measure V associated with an amount of reduction in the uncertainty of driving conditions of a mapping r (i.e. a symbolic description highlighting relationships between tough road information (tough or not) and physical locations) while avoiding known troubling spots, such as slipping spots, nearby. Alternatively, r may represent a region where the path is to be planned. Measure V can be expressed as:

$$V_{x,u} = I[r; \tilde{z}] + \alpha \Sigma_{i=t+1}^{i=t+T} \min(d_{max}, dis(x_i, r))$$

$$x_{i+1} = f(x_i, u_i).$$

where, x represents a path (e.g. $x_i, x_{i+1}, \ldots x_{i+T}$), i is a time instance, $x_i$ represents a vehicle state (e.g. including a position) at time instance i, $\alpha$ is a weighting factor, $d_{max}$ is a distance threshold, dis $(x_i, r)$ represents a distance between the vehicle at time instance $(x_i)$ (e.g. including a location or position of path x) and known trouble spots in the mapping r, e.g. a closest slippery location I_r in the mapping r to the vehicle of vehicle state $x_i$, min $(d_{max}, dis (x_i, r))$ is the minimum value between $d_{max}$ and dis $(x_i, r)$, $u_i$ represents vehicle action (e.g. the speed, the direction or other controls of the vehicle) at time instance i, the next vehicle state $x_{i+1}$ is a function $f(x_i, u_i)$ of $x_i$ and $u_i$, $\tilde{z}$ represents predicted capability of observing or measuring driving condition (e.g. slippery condition) along path x. I[r; $\tilde{z}$] may represent an amount of reduction in the uncertainty of driving condition in area r based on measurement of road conditions. Planning a path may be formulated in a manner to find a path to optimize $V_{x,u}$ among feasible sets of vehicle states x and feasible set of vehicle controls u.

In some embodiments, I[r; $\tilde{z}$] may be based on a sum of integrals over possible measured driving conditions (along path x) for a past time window (e.g. from t-W to current time t, W being a sliding time window or a length of a time period):

$$I[r; \tilde{z}] = -\log \frac{\left[\sum_{t-w}^{t} \int p(r, \tilde{z}) p(r) p(\tilde{z}) d\tilde{z}\right]^2}{\sum_{t-w}^{t} \int p^2(r, \tilde{z}) d\tilde{z} \sum \int p^2(r) p^2(\tilde{z}) d\tilde{z}}$$

where p(r) indicates a likelihood or probability that driving condition (e.g. slipper condition) in mapping r is completely known, p($\tilde{z}$) indicates a likelihood that a measure $\tilde{z}$ (e.g. along path x) identifies a trouble area or spot, p(r, $\tilde{z}$) indicates a likelihood (a joint probability) that the driving condition measure $\tilde{z}$ identifies a trouble area or spot in the mapping r. Sliding time window size W may be configured to consider information uncertainty in the immediate past W time slots (or time units). In one embodiment, I[r;z] may correspond to a condition change value of a path.

I[r; z̃] may describe CSQMI (Cauchy-Schwarz quadratic mutual information) representation as similarly discussed in "Information-theoretic mapping using Cauchy-Schwarz Quadratic Mutual Information," by Benjamin Charrow, Sikang Liu, Vijay Kumar, Nathan Michael, Proc. IEEE Int. Conf. Robotics and Automation, 2015.

In one embodiment, a path may be selected among feasible paths (e.g. in the mapping r) based on feasible control actions (e.g. possible control actions or combinations of control actions) for driving the vehicle towards a destination from its current location. Each possible path may be associated with a measure V value. As an example, the selected path may correspond to one path having a largest measure V among all the possible paths considered. Other applicable selection mechanisms may be applied based on a comparison among different measure V values associated with the possible paths.

At operation 235, the vehicle may calculate a second weighted value based on the second condition change value, the second distance and the effect value. The second weighted value is associated with the second path. The effect value determined at operation 225 may be used to adjust the weight of the second condition change value and the weight of the second distance.

The method of calculating the second weighted value may be the same as the method used for computing the first weighted value at operation 230. For example, the formula $V_x = E_x + \alpha\, D_x$, may also be used to calculate the second weighted value.

Figure 3:
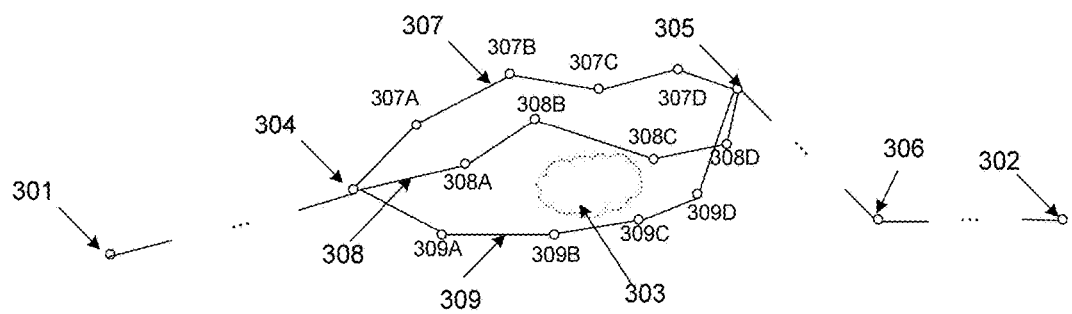
FIG. 3 is a diagram of selecting a path among a plurality of candidate paths according to an embodiment of the disclosure.

In some embodiments, the vehicle may calculate three or more paths, where the three or more paths, such as paths 305-307 in FIG. 3, are respectively from the first point to the second point. In these embodiments, the vehicle may respectively calculate weighted values for two or more of the three or more paths, or may respectively calculate weighted values for all of the three or more paths.

At operation 240, the vehicle may select a path based on the first weighted value and the second weighted value.

In some embodiments, if the first weighted value is larger than the second weighted value, the first path may be selected by the vehicle; if the first weighted value is smaller than the second weighted value, the second path is selected.

When $\alpha$ is large, the path far from the trouble area has higher possibility to be selected as the path to drive or move along. Because the selected path may be far from the trouble area, the vehicle has higher possibility of driving or moving safely and stably. Because the weather is becoming better, the trouble area in the map maintained in the server or in the vehicle may be more stable.

When $\alpha$ is small, the path close to the trouble area has higher possibility to be selected as the path to drive or move along. Because uncertainty of current driving conditions along the path close to the trouble area may be higher than driving conditions in regions farther away from the trouble area, especially when the weather is bad, driving or moving a vehicle along such path may allow the detected actual driving conditions or driving situations to reduce the uncertainty of existing information on road conditions in the map. A driving condition may represent whether a point is good or bad for driving or moving a vehicle. Comparing to other paths, driving or moving along a path close the trouble area may reducing more uncertainty of old (or existing, current) driving information in the map.

In some embodiments, based on the operations, the vehicle may be encouraged to or have higher possibility to drive closer to the trouble area when the weather is worse for driving, so that the vehicle may explore more driving conditions to collect additional information for the area for driving a vehicle. It may be assumed that a path closer to a trouble area may be possible of having more uncertain points to explore than a path farther away from the trouble area. The uncertain points may be location points which are bad, uncomfortable or dangerous for vehicle driving, but have not been identified (or partially identified with a level of uncertainty) in the map. When the vehicle passes the uncertain points, the situation or status of the uncertain points may be checked by the vehicle. Because the policy of selecting a path is associated with the change of the weather, the exploration of the driving condition may be done with reduction of unsafe driving.

Method 200 may be applicable for full-autonomy driving and/or half-autonomy driving.

In some embodiments, more than two weighted values including the first weighted value and the second weighted value may be used for path selection. A path may be selected based on only the first and second weighted values or may be selected based on three or more weighted values including the first and second weighted values. For example the path selected at operation 240 may be one of the first and second paths, or a path other than the first and second paths. In one embodiment, a third path may be selected based on the first weighted value, the second weighted value and a third weighted value which is associated with the third path.

In some embodiments, when the distance value between a path and the trouble area is smaller than a threshold value or the weighted value of the path is larger than a threshold value, the path will be excluded from candidate paths. In other words, the path will not be selected.

At operation 245, the vehicle measures driving condition of a plurality of points on the selected path when the vehicle drives (moves) along the selected path. Because the driving condition of the plurality of points are measured by the vehicle rather than calculated or anticipated by the vehicle, the measured driving condition may be the real driving condition of the plurality of points.

At operation 250, the vehicle sends the measured driving condition of the plurality of points to the server. Consequently, the server may update driving condition of the area based on the measured driving condition of the plurality of points. Because the selected path is within the area, the driving condition of the area stored in the server may include old (e.g. recent) driving condition of at least some of the plurality of points on the selected path. Therefore, the measured driving condition of the plurality of points on the selected path may be used by the server to update the driving condition of some points in the area that stored in the server.

In some embodiments, because the vehicle may drive closer to the trouble area when the weather becomes worse, the measured driving condition of the plurality of points is very possible to be different from driving condition of the plurality of points stored in the server. Therefore, the measures obtainable by the vehicle driving along the selected path may allow the server to reduce more uncertainty of the road conditions than the measures obtainable by the vehicle driving along another path.

FIG. 3 is a diagram of selecting a path among a plurality of candidate paths according to an embodiment of the disclosure.

As illustrated in FIG. 3, in order to drive from point 301 to point 302 in map of area 300 including trouble area 303, the vehicle may calculate three waypoints 304, 305, 306. Point 301 may be the current location of the vehicle, the location of the starting point of a travel, or a location at which the vehicle is going to arrive in a time period, such as several seconds. Point 302 is a destination of the vehicle. In some embodiments, the vehicle may select any two waypoints of the plurality of waypoints as a first point and a second point.

The vehicle may further calculate two or more paths between the selected first point and the second point. In some embodiments, the first point is point 304 in FIG. 3 and the second point is point 305 in FIG. 3. The vehicle may obtain path 307, path 308 and 309, which are from point 304 to point 305.

In order to selecting a path among paths 307-309 (the plurality of candidate paths), the vehicle needs to respectively determine the condition change values of paths 307-309, and further needs to determine the distance between path 307 and trouble area 303, the distance between path 308 and trouble area 303 and the distance between path 309 and trouble area 303. Moreover, the vehicle also needs to obtain the effect value according to the method for obtaining effect value in method 200. After all the above information is obtained, the vehicle may calculate a first weight value for path 307, a second weighted value for path 308 and a third weighted value for path 309 based on the method for calculating a weighted value for a path disclosed in method 200.

The following is associated with determining the condition change values of paths 307-309.

In some embodiments, with respect to path 307, the vehicle may determine or calculate points 307A, 307B, 307C and 307D in FIG. 3, and then respectively determine condition change value of each of points 307A-307D based on the above method. In an example, condition change value 1 is associated with point 307A, condition change value 2 is associated with point 307B, condition change value 3 is associated with point 307C, and condition change value 4 is associated with point 307D. The vehicle may add condition change values 1-4 to get the condition change value of path 307. According to the above method, the vehicle may determine or calculate points 308A, 308B, 308C and 308D in FIG. 3 and then determine the condition change value of path 308. Similarly, the vehicle may determine or calculate points 309A, 309B, 309C and 309D in FIG. 3 and then determine the condition change value of path 309.

The following is associated with calculating the distances between distance between path 307 and trouble area 303, the distance between path 308 and trouble area 303 and the distance between path 309 and trouble area 303.

In order to calculate the distance between a path and a trouble area, the vehicle may select a plurality of points on the path and respectively calculate the distances between each select point on the road and the trouble area. In some embodiments, the selected points on a path may be the determined or calculated points used for determine the condition change value of the path. For example, with respect to path 307, the selected points for calculating distiance may be points 307A-307D; with respect to path 308, the selected points for calculating distance may be points 308A-308D; and with respect to path 309, the selected points for calculating distance may be points 309A-309D.

In some embodiments, the distance between a point on a path and a trouble area may be the distance between the point on the path and a closest point in the trouble area. The closest point in the trouble area may be a point closer to the point on the path than any other point in the trouble area. For example, the distance between point 307A on path 307 and trouble area 302 as illustrated in FIG. 3 may be the distance between point 307A and a closest point in trouble area 302 which is closer to point 307A than any other point in trouble area 302. In some embodiments, the distance between a point on a path and a trouble area may be the distance between the point on the path and the geometry center of the trouble area, or the distance between the point on the path and any point in the trouble area.

Based on the above method, the vehicle may calculate distance 1, which is the distance between point 307A and trouble area 302, distance 2 which is the distance between point 307B and trouble area 302, distance 3 which is the distance between point 307C and trouble area 302, and distance 4 which is the distance between point 307D and trouble area 302.

After obtaining the distances between each selected point on the path and the trouble area, such as the distances respectively between each of points 307A-307D on path 307 and trouble area 302 in FIG. 3, the vehicle may further determine a valid distance for each selected point on the path. A valid distance between a point on a path and a trouble area may be determined based on a distance between the point and the trouble area, and a distance threshold. In some embodiments, if the distance between the point on the path and the trouble area is shorter than the distance threshold, the distance between the point on the path and the trouble area may be the valid distance (or effective distance) between the point on the path and the trouble area. If the distance between the point on the path and the trouble area is longer than the distance threshold value, the distance threshold may be the valid distance value between the point on the path and the trouble area.

The vehicle may calculate the distance between the path and the trouble area based on the valid distances between some or all the selected points on the path and the trouble area. For example, the distance between point 307A and trouble area 303 in FIG. 3 is 10 meter (m), the distance between point 307B and trouble area 303 in FIG. 3 is 7 m, the distance between point 307C and trouble area 303 is 6 m, the distance between point 307D and trouble area 303 is 2 m, and the distance threshold is 4 m. As an example, the valid distance between point 307A and trouble area 303 may be 4 m because the distance between point 307A and trouble area 303 (7 m) is longer than the distance threshold (4 m). Similarly, the valid distances between point 307B and trouble area 303 and the valid distance between point 307C and trouble area 303 are respectively 4 m. The valid distance between point 307D and trouble area 303 is 2 m because the distance between point 307D and trouble area 303 (2 m) is shorter than the distance threshold (4 m).

Based on the above four valid distances respectively associated with points 307A-307D, the vehicle may calculate the distance between path 307 and trouble area 303. For example, the distance may be the average value of the above four valid distances associated with points 307A-307D, which is 3.5 m, or the total value of the above four valid distances respectively associated with points 307A-307D, which is 14 m. In some embodiments, the vehicle may use a portion of the above four valid distances to calculate the distance between path 307 and trouble area 303. For example, the distance between path 307 and trouble area 303 may the average value of the valid distance between point 307B and trouble area 303, the valid distance between point 307C and trouble area 303, and the valid distance between point 307D and trouble area 303. Similarly, the vehicle may calculate the distance between the path 308 and trouble area 303, and the distance between path 309 and trouble area 303.

Figure 4:
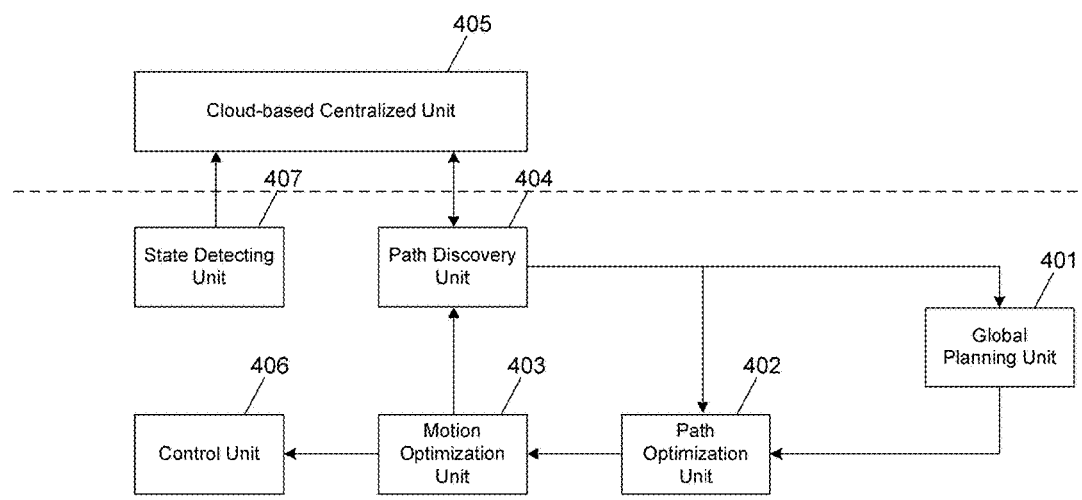
FIG. 4 is flow chart of a method for selecting a path according to an embodiment of the disclosure.

FIG. 4 is a flow chart of a method for selecting a path according to an embodiment of the disclosure. FIG. 4 illustrates how the units in a vehicle and the unit in a server cooperate for the path selection. Global planning unit 401, path optimization unit 402, motion optimization unit 403, path discovery unit 404, control unit 406 and state detecting unit 407 may be included in the vehicle, and cloud-based centralized unit 405 may be included in the server. These units may be software units, hardware units or a combination of both. Any action performed by a unit may be actually fully or partially performed by a processor according to the instructions in the unit.

Global planning unit 401 in vehicle may calculate a route including a plurality of waypoints. A waypoint may be a point to be passed by the vehicle to arrive at the second point. For example, points 304-307 in FIG. 3 are waypoints calculated by the vehicle. In some embodiments, global planning unit 401 may perform the calculation of the plurality of waypoints in operation 210. In some embodiments, global planning unit 401 may perform the calculation for the route selection periodically (e.g. per 10 seconds, 5 seconds, 15 seconds or other applicable time interval).

Path optimization unit 402 may further calculate a plurality of paths between two waypoints. In some embodiments, the two waypoints are neighboring points or not neighboring waypoints. In some embodiments, path optimization unit 402 may calculate a plurality of paths for each pair of neighboring waypoints. In some embodiment, path optimization unit 402 may perform the path calculation in operation 210. In some embodiments, path optimization unit 402 may perform the calculation of the plurality of paths one time per 0.1-10 seconds.

Motion optimization unit 403 may determine a plurality of points on a path between two waypoints. In some embodiments, motion optimization unit 403 may respectively determine a plurality of points on each path between the two points. Furthermore, motion optimization unit 403 may calculate estimated driving conditions of some or all of the points determined by motion optimization unit 403. An estimated driving condition of a point may indicate whether the point is estimated as being in a good or poor status for driving a vehicle. In some embodiments, the estimated driving condition may further indicate the level of the poor status. Moreover, motion optimization unit 403 may send the estimated driving conditions of points determined by motion optimization unit 403 to path discovery unit 404. In some embodiments, motion optimization unit 403 may perform the calculation of the estimated driving conditions periodically, such as once per 0.1-10 second.

Path discovery unit 404 may determine condition change values of points determined by motion optimization unit 403 based on the estimated driving condition of the points determined by motion optimization unit 403.

In some embodiments, path discovery unit 404 may receive the estimated driving condition of a point from motion optimization unit 403 and send the estimated driving condition of the point to a server. Cloud-based centralized unit 405 in the server may compare the received estimated driving condition of the point with a driving condition of the point recorded in the server to determine the condition change value of the point. In some embodiments, in a first scenario that the estimated driving condition of the point shows that the point is poor for driving and the driving condition of the point recorded in the server shows that the point is good for driving, cloud-based centralized unit 405 may determine a value as the condition change value of the point, such as 1. In a second scenario when the estimated driving condition of the point and the driving condition of the point recorded in the server are same, cloud-based centralized unit 405 may determine another value as the condition change value of the point, such as 0. After cloud-based centralized unit 405 determines the condition change value of the point, cloud-based centralized unit 405 may send the condition change value of the point to path discovery unit 404 so that path discovery unit 404 may determine the condition change value of the point.

In some embodiments, path discovery unit 404 may receive the estimated driving condition of a point from motion optimization unit 403. Path discovery unit 404 may further compare the estimated driving condition of the point received from motion optimization unit 403 with an old driving condition of the point received from a server. Based on the comparison, path discovery unit 404 may determine the condition change value of the point. In some embodiments, the specific method of determining the condition change value based on the comparison may be same or similar to the method of determining the condition change value of a point perform by cloud-based centralized unit 405.

Furthermore, path discovery unit 404 may determine the condition change value of a path based on the condition change values of a plurality of points on the path. For example, path discovery unit 404 may determine the condition change value of path 307 according to a sum of condition change value of point 307A, condition change value of point 307B and condition change value of point 307C. Path discovery unit 404 may determine the condition change value of any path between two waypoints in a similar manner.

In some embodiments, path discovery unit 404 may determine the condition change value of a path once per 0.1-10 second.

Moreover, path discovery unit 404 may respectively calculate distances between the paths and the trouble area. For example, path discovery unit 404 may calculate a first distance value between the first path and the trouble area and a second distance value between the second path and the trouble area. The specific method of calculating the distance between a path and the trouble area may be the same as or similar to the method used at operation 220. In some embodiments, path discovery unit 404 may calculate the distances once per 0.1-10 second.

Path discovery unit 404 may further receive the effect value on vehicle driving associated with a change of weather.

After obtaining the condition change values of a plurality of paths, the distances between the plurality of paths and the trouble area and the effect value, path discovery unit 404 may determine weighted values respectively associated with the plurality of paths. For example, path discovery unit 404 may obtain the condition change value of path 307, the condition change value of path 308 and the condition change value of path 309. The specific method of calculating the condition change values of a plurality of paths may be the same as or similar to the method used at operations 230 and 235.

After obtaining the condition change values of a plurality of paths, path discovery unit 404 may select a path based on the condition change values. The specific method of path selection may be the same as or similar to the method used at operation 240.

Path discovery unit 404 may further send information associated with the selected path to motion optimization unit 403. Motion optimization unit 403 may generate control information based on the selected path and send the control information to control unit 406.

Control unit 406 may control the driving based on the received control information. For example, control unit 406 may generate control signals to control the direction, accelerator and brake of the vehicle to make to the vehicle move along the selected path.

When the vehicle travel along the selected path, state detecting unit 407 detect the driving conditions of a plurality of points on the selected path. In some embodiments, the plurality of points on the path may include the points which are determined by motion optimization unit 403 on the path. For example, the vehicle may detect the driving conditions of points 307A-307D determined by motion optimization unit 403 along path 307 selected by path discovery unit. The driving condition of point may indicate whether the point is slipping, uneven or in a good status for driving. In some embodiments, control unit 406 may send controlling instructions to the vehicle once per 0.02-0.1 second. Such real detecting may reduce the uncertainty of the old driving condition in the map maintained in the server or in the vehicle.

State detecting unit 407 may send the detected driving conditions of points on the selected path to the server so that the server may update the driving conditions of the points stored in the database of the server. In some embodiments, the state detecting unit 407 may directly send the driving conditions of the points to the server, or send the driving conditions of the points to path discovery unit 404 so that path discovery unit 404 may further send the received driving conditions of the points to the server. In some embodiments, state detecting unit 407 may send detected driving conditions of points on the selected path to the server once per 0.02-0.1 second.

Figure 4A:
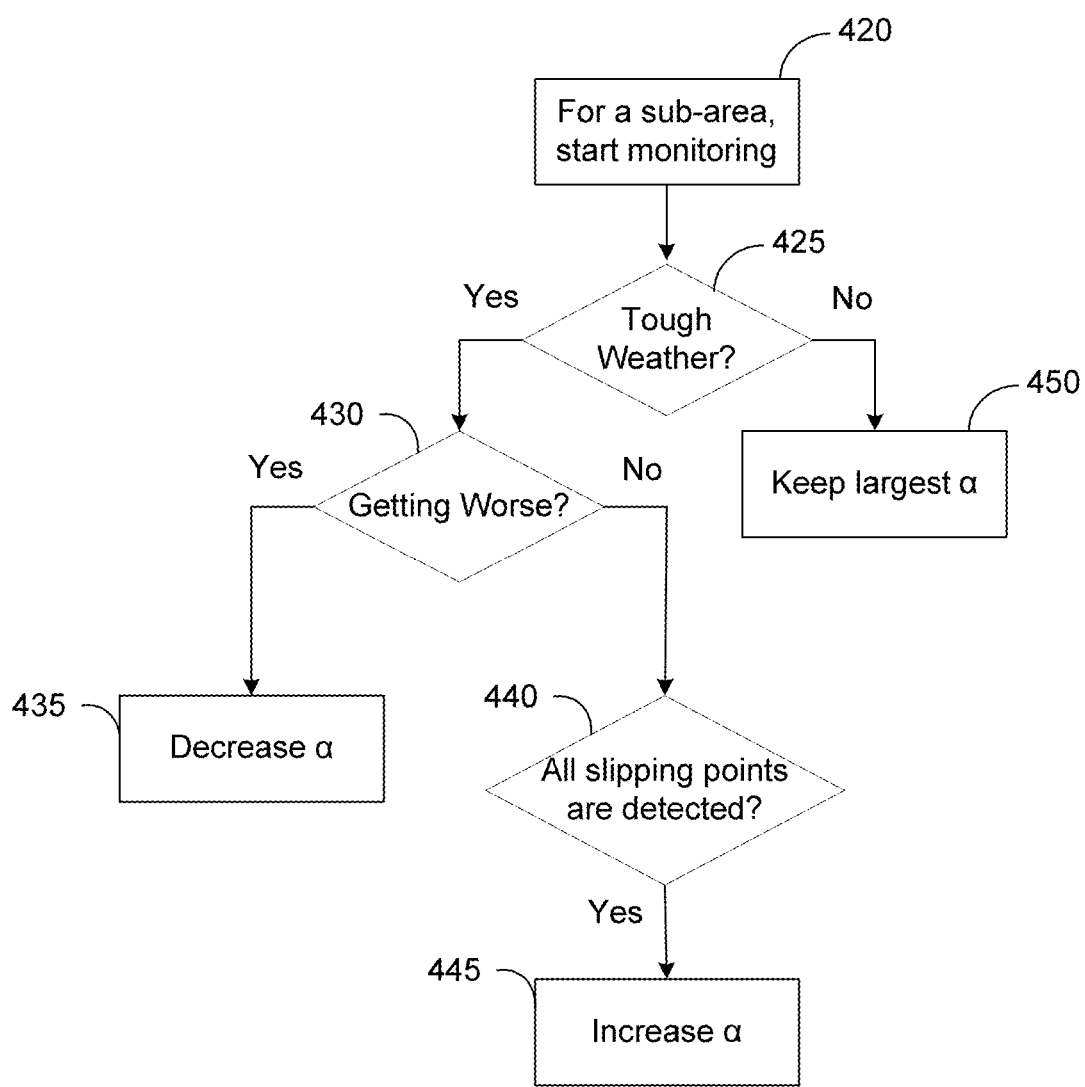
FIG. 4A illustrates a flow chart of a method 400A of modifying the value of α according to an embodiment of a disclosure.

FIG. 4A illustrates a flow chart of a method 400A of modifying the value of a (e.g. a weather factor or a weighting factor) according to an embodiment of a disclosure. In one embodiment, operations 400A may be performed by processing logic (e.g. in one or more servers) residing in a cloud service. Alternatively or optionally, operations 400A may be performed in a distributed manner via processing logic of multiple vehicles and the cloud service.

At operation 420, the vehicle or server may start to monitor weather for an area. In some embodiments, the area may represent a sub-area of a large region. For example, the vehicle may monitor whether it is raining or snowing in a sub-area of a large region.

At operation 425, the vehicle or server may determine whether the weather of the area is tough. For example the vehicle may determine there is heavy rain in this area. If the weather is though, method 400A may go to operation 430. If the weather is not tough, method 400 A may go to operation 450.

At operation 430, the vehicle or server may monitor that whether the tough weather is becoming worse. If the tough weather is becoming worse, method 400A may go to operation 435. If the tough weather is not becoming worse, method 400A may go to operation 440.

At operation 435, the vehicle may decrease the value of $\alpha$. Decreasing the value of $\alpha$ may encourage the vehicle or make the vehicle to move along a path closer to the trouble area than some other paths. Because driving conditions of the path close to the trouble area may be less reliable (i.e. with high levels of uncertainty), especially when the weather is bad, driving or moving along such path may be rewarded with large amount of information via the detection of the real driving conditions of the path, thus significantly reducing the uncertainty of the existing driving or driving conditions in the map. A driving condition may represent whether a point is good or bad for driving or moving a vehicle. Comparing to other paths, driving or moving along a path close the trouble area may reducing more uncertainty of old driving information in the map.

At operation 440, the vehicle or server may determine whether the vehicle or the server already has detected slipping information associated with all points in the area. If slipping information associated with all points in the area is detected, method 400A may go to operation 445.

At operation 445, the vehicle or server may increase the value of $\alpha$. Increasing the value of $\alpha$ may encourage the vehicle or make the vehicle to move along a path farther to the trouble area than some other paths. Because the selected path may be far from the trouble area, it is more likely the vehicle can move safely and stably along the path. As the weather is becoming better, driving conditions of the trouble area in the map maintained in the server or in the vehicle may be more stable.

At operation 450, the vehicle may keep or select largest $\alpha$. When value of $\alpha$ is the largest possible value, the selected path may be far from the trouble area. Therefore, it is more likely for the vehicle to move safely and stably. As the weather is becoming better, driving conditions of the trouble area in the map maintained in the server or in the vehicle may be more stable.

Figure 5:
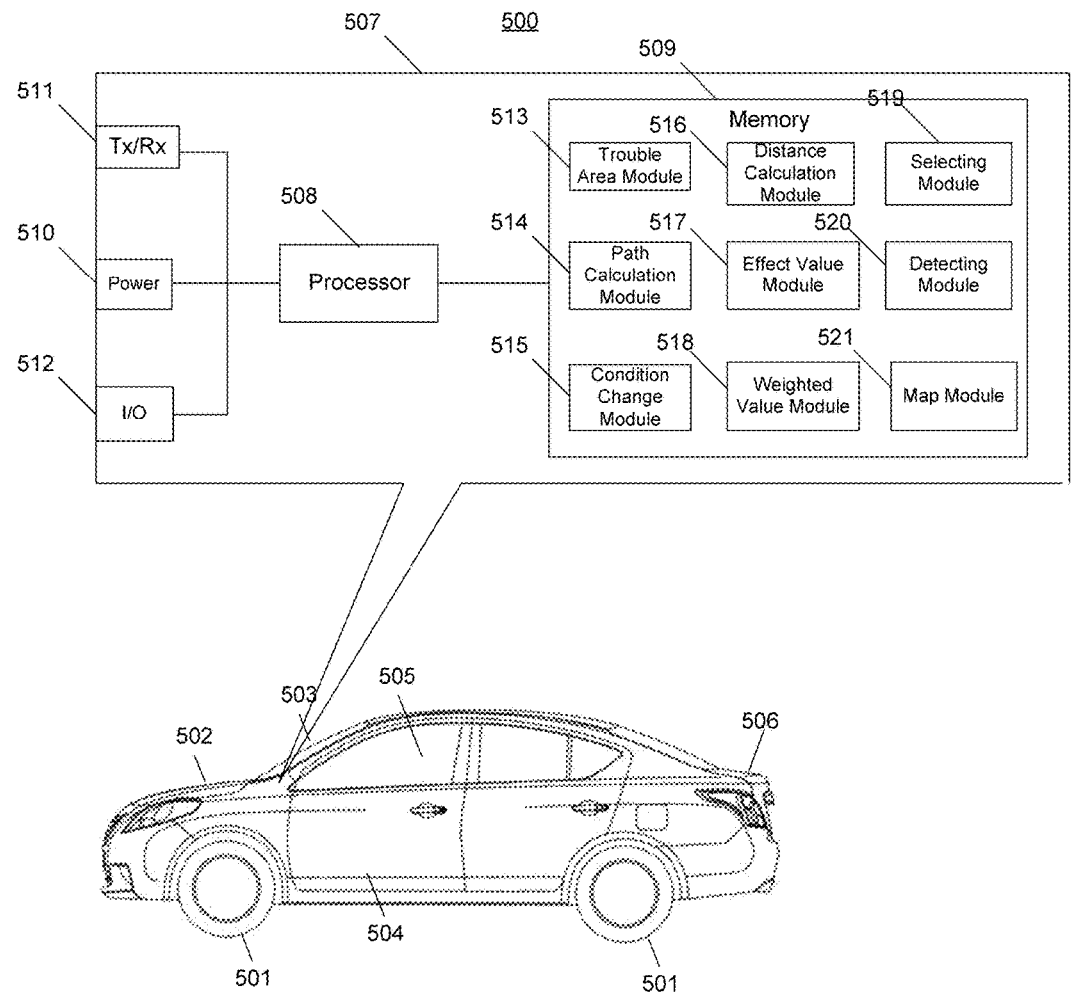
FIG. 5 illustrates a schematic diagram of a vehicle according to an embodiment of a disclosure.

FIG. 5 illustrates a schematic diagram of a vehicle 500 according to an embodiment of a disclosure.

As illustrated in FIG. 5, vehicle 500 may include wheels 501, a hood 502, a shield 503, doors 504, windows 505, a trunk 506, a chassis (not illustrated in FIG. 5), an engine (not illustrated in FIG. 5 and a computing device or control mechanism 507. Vehicle 500 may be any vehicle in any embodiment in this disclosure.

As illustrated in FIG. 5, computing device 507 may include processor 508, memory 509, power supply 510, transmitting/receiving (Tx/Rx) 511 and Input/Out (I/O) 512.

In some embodiments, processor 508 may include one or more processors. Processor 508 may be implemented as a general processor or may be part of one or more application specific integrated circuits (ASICs) and/or digital signal processors (DSPs).

In some embodiments, memory 509, power supply 510, Tx/Rx 511 and I/O 512 may all be directly or indirectly coupled with processor 508 via a bus or a dedicated connection. Memory 509 may be a random access memory (RAM), such as a dynamic RAM (DRAM) or a static RAM (SRAM), a read only memory (ROM). In some embodiments, memory may be a solid-state drive (SSD) or a hard disk drive (HDD).

In some embodiments, Tx/Rx 511 may have an antenna which is used to transmit and receive wireless signals, such as Wi-Fi signals, WCDMA signals and/or LTE signals. In some embodiments, Tx/Rx 511 may have an interface used for sending signals to a mechanical control system to control the movement or driving of the vehicle. I/O 512 may include a touch screen. The touch screen may display information to passengers and may receive passengers' instructions.

In some embodiments, power supply 510 may be used to provide electricity to elements in computing device 507, such as processor 508, memory 509, Tx/Rx 511 and/or I/O 512. In some embodiments, power supply 510 may be a physical circuit to stabilize or modify the voltage of incoming electricity. In some embodiments, power supply 510 may transform alternating current into direct current.

Memory 509 may include software modules, such as trouble area module 513, path calculation module 514, condition change module 515, distance calculation module 516, effect value module 517, weighted value module 518, selecting module 519, detecting module 520 and map module 521. In some embodiments, an action performed by a software module may be based on processor 508 performing that action according to the instructions in the software module. Processor 508 may perform the action by itself, instruct other software or hardware units to perform the action, or perform the action together with other software or hardware units.

In some embodiments, trouble area module 513 may receive information associated with a trouble area from a server to perform operations. For example, actions performed at operation 205 of FIG. 2 may be based on trouble area module 513.

In some embodiments, path calculation module 514 may calculate a first path and a second path, each of which is from a first point to a second point. For example, actions performed at operation 210 may be based on path calculation module 514.

In some embodiments, condition change module 515 may obtain a first condition change value of the first path and a second condition change value of the second path.

In some embodiments, in order to obtain the first condition change value of the first path, condition change module 515 may calculate expected driving condition of a first point on the first path and expected driving condition of a second point on the first path. Furthermore, condition change module 515 may send the expected driving condition of the first point and the expected driving condition of the second point to the server. Moreover, condition change module 515 may receive condition change value of the first point and condition change value of the second point. Condition change module 515 may calculate the first condition change value of the first path based on the condition change value of the first point and the condition change value of the second point.

In some embodiments, in order to obtain the first condition change value of the first path, condition change module 515 may also calculate expected driving condition of a first point on the first path and expected driving condition of a second point on the first path. Furthermore, condition change module 515 may receive old driving condition of the first point and old driving condition of the second point from the server. Moreover, condition change module 515 may generate condition change value of the first point based on the expected driving condition of the first point and the old driving condition of the first point received from the server. Condition change module 515 may further generate condition change value of the second point based on the expected driving condition of the second point and the old driving condition of the second point received from the server. Based on the condition change value of the first point and the condition change value of the second point, condition change module 515 may calculate the first condition change value of the first path. Condition change module 515 may obtain the second condition change value of the second path in a similar manner to how the first condition change value is obtained.

In some embodiments, actions performed at operation 215 of FIG. 2 may be based on condition change module 515.

In some embodiments, distance calculation module 516 may calculate a first distance value between the first path and the trouble area and a second distance value between the second path and the trouble area.

In some embodiments, in order to calculate the first distance value between the first path and the trouble area, distance calculation module 516 may determine a first point and a second point on the first path; determine a distance value between the first point and the trouble area and a distance value between the second point and the trouble area; determine a smaller value between the distance value between the first point and the trouble area and a distance threshold as a first valid distance value; determine a smaller value between the distance value between the second pint and the trouble area and the distance threshold as a second valid distance value; and determine the first distance value between the first path and the trouble area based on the first valid distance value and the second valid distance value.

Distance calculation module 516 may calculate the second distance value between the second path and the trouble area in a similar manner to how the first distance value is calculated.

In some embodiments, actions performed at operation 220 of FIG. 2.0 may be based on distance calculation module 516.

In some embodiments, effect value module 517 may obtain an effect value on vehicle driving associated with a change of weather. The effect value module 517 may receive the effect value from a server. The effect value module 517 may also determine the effect value by itself. For example, effect value module 517 may obtain first weather information at a first time instant and a second weather information at a second instant, and determine the effect value based on the first weather information and the second weather information. The first and second weather information may be detected by the vehicle itself, or be received from a server. In some embodiments, the first time instant may be the current time instant at which the effect value is obtained and the second time instant may be earlier than the first time instant.

In some embodiments, actions or operations performed at operation 225 of FIG. 2 may be based on effect value module 517.

In some embodiments, weighted value module 518 may calculate a first weighted value based on the first condition change value, the first distance and the effect value. Weighted value module 518 may further calculate a second weighted value based on the second condition change value, the second distance and the effect value. In some embodiments, as the effect value indicates that the weather is changing to a better condition for driving a vehicle, weight of the first condition change value decreases and the weight of the first distance increases for determining the first weighted value. In some embodiments, as the effect value indicates that the weather is changing to a worse condition for driving a vehicle, the weight of the first condition change value increases weight of the first distance value decreases for determining the first weighted value.

Similarly, weighted value module 518 may further calculate a second weighted value based on the second condition change value, the second distance and the effect value.

In some embodiments, actions or operations at operations 230 and 235 of FIG. 2 may be performed by weighted value module 518.

In some embodiments, selecting module 519 may select a path based on the first weighted value and the second weighted value.

In some embodiments, if the first weighted value is larger than the second weighted value, the first path may be selected by the vehicle, if the first weighted value is smaller than the second weighted value, the second path is selected.

In some embodiments, there may be more than two weighted values including the first weighted value and the second weighted value. A path may be selected based on only the first and second weighted values or may be selected based on three or more weighted values including the first and second weighted values. In some embodiments, the path selected by selecting module 519 may be one of the first and second paths, or a path other than the first and second paths.

In some embodiments, detecting module 520 may detect a real condition change value of a point on the selected path when the vehicle moves along the selected path, and send the detected real condition change value of the point to the server. With the detected real condition change value of the point, the server may have a better knowledge of the condition with respect of driving a vehicle.

In some embodiments, detecting module 520 may respectively detect the real condition change values of a plurality of points on the selected path. The plurality of points may include the points which are used to calculate the estimated condition change value of the selected path. For example, detecting module 520 may detect the real condition change values of points 1 and 2 based on a calculation of the condition change value of the selected path based on the estimated condition change values of points 1 and 2 on the selected path.

In some embodiments, the vehicle not only receives information associated with the trouble area from the server, but also receives a map from the server. The trouble area may be included in the map. Map module may be used to receive the map from the server.

In some embodiments, the map may be pre-configured in the vehicle rather than be received from the server. For example, the map may be pre-configured in the vehicle during the manufacture of the vehicle.

Figure 6:
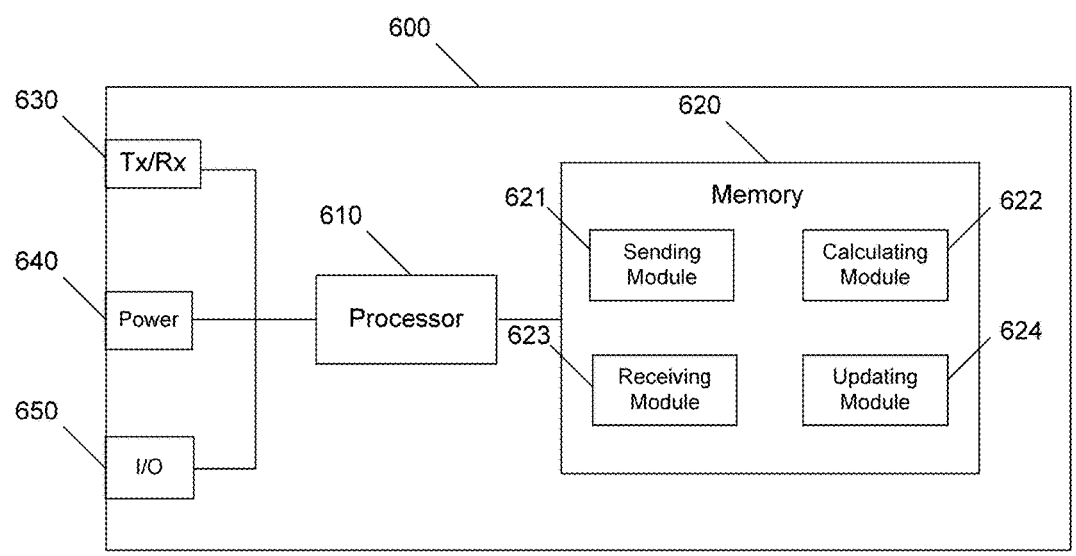
FIG. 6 illustrates a schematic diagram of a server according to an embodiment of a disclosure.

FIG. 6 illustrates a schematic diagram of a server 600 according to an embodiment of a disclosure.

As illustrated in FIG. 6, server 600 may include processor 610, memory 620, transmitting/receiving (Tx/Rx) 630, power supply 640, and Input/Out (I/O) 650.

Processor 610 may include one or more processors. Processor 610 may be implemented as a general processor or may be part of one or more application specific integrated circuits (ASICs) and/or digital signal processors (DSPs).

Memory 620, transmitting/receiving (Tx/Rx) 630, power supply 640, and Input/Out (I/O) 650 may all be directly or indirectly coupled with processor 610 via a bus or a dedicated connection. Memory 620 may be a random access memory (RAM), such as a dynamic RAM (DRAM) or a static RAM (SRAM), a read only memory (ROM). Memory may be a solid-state drive (SSD) or a hard disk drive (HDD).

Tx/Rx 630 may have an antenna which is used to transmit and receive wireless signals, such as Wi-Fi signals, WCDMA signals and/or LTE signals. Tx/Rx 630 may have an interface used for sending signals to a mechanical control system to control the movement or driving of the vehicle. I/O 650 may include a touch screen. The touch screen may display information to passengers and may receive passengers' instructions.

Power supply 640 may be used to provide electricity to elements in server 600, such as processor 610, memory 620, Tx/Rx 630 and/or I/O 650. Power supply 640 may be a physical circuit to stabilize or modify the voltage of incoming electricity. Power supply 640 may transform alternating current into direct current.

In some embodiments, memory 620 may include software modules, such as sending module 621, calculating module 622, receiving module 623 and updating module 624. Various operations may be performed by these modules as processor 610 executes instructions included in these modules.

For example, sending module 621 can forward or send driving condition of an area to a vehicle. The driving condition can indicate that the area comprises a trouble area. Calculating module 622 can calculate an effect value based on weather information. Sending module 621 can send the effect value to the vehicle. Receiving module 623 can receive from the vehicle driving condition actually measured or sensed along a path or related to a plurality of points in the area. Updating module 624 can update information related to the driving condition of the area in a map maintained in the cloud based on received the driving condition of the plurality of points. Receiving module 623 can collect information related to road conditions from multiple vehicles at various locations in the area to update the map. Sending module 621 can dynamically distribute update to date driving conditions to multiple vehicles driving through areas covered in the map.

Calculating module 622 can generate or calculate the effect value according to the method described in FIG. 4A. The effect value is associated with the change of weather. For example, the effect value increases when the weather becomes better for driving the vehicle and the effect value decreases when the weather becomes worse for driving the vehicle. In some embodiments, based on instructions in memory 620, processor 610 may performs all operations of server in all embodiments associated with all FIGS.

In some embodiments, the server sends the vehicle the effect value associated with the change of weather, so that the vehicle may calculate weighted value based on the effect value for path selection. Because the effect value decreases when weather becomes worse, the selected path may be closer to the trouble area. Therefore, the vehicle driving along the selected path may detect more sliding points or sliding sub-area and reduce more uncertainty than driving along other paths. Therefore, the server contributes to efficient detection of driving condition (e.g. to reduce uncertainties in road condition, such as associated with changing weather, as quickly as possible).

While several embodiments have been provided in the present disclosure, it should be understood that the disclosed methods and devices might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for selecting a path by a vehicle having a mechanical system for moving the vehicle, a transceiver and a processor, comprising:
   receiving, by the transceiver of the vehicle, information on driving condition of an area from a server, wherein the driving condition indicates that the area comprises a trouble area;
   calculating, by the processor of the vehicle, a first path and a second path from a first point of location to a second point of location based on the driving condition of the area, each path from the first point to the second point;
   obtaining, by the processor of the vehicle, a first condition change value of the first path and a second condition change value of the second path, wherein a condition change value for a path represents an amount of reduction in uncertainty of the driving condition of the area based on road condition measurements along the path;
   calculating, by the processor of the vehicle, a first distance value indicating a distance between the first path and the trouble area, and a second distance value indicating a distance between the second path and the trouble area;
   obtaining, by the processor of the vehicle, an effect value on vehicle driving associated with a change of weather;
   calculating, by the processor of the vehicle, a first weighted value and a second weighted value, the first weighted value based on the first condition change value and the first distance value weighted by the effect value, the
   second weighted value based on the second condition change value and the second distance value weighted by the effect value, wherein the change of weather to a worse condition for driving a vehicle corresponds to a decrease of a weight by the effect value;
   selecting, by the processor of the vehicle, a path from the first path and the second path based on the first weighted value and the second weighted value, wherein the selected path includes a sequence of vehicle states; and
   sending, by the processor of the vehicle, the sequence of vehicle states to the mechanical system to move the vehicle from the first point to the second point along the selected path.

2. The method of claim 1, further comprising:
   measuring, by the processor of the vehicle, a driving condition of a point on the selected path when the vehicle moves along the selected path; and
   sending, by the transceiver of the vehicle, the measured driving condition of the point to the server.

3. The method of claim 1, further comprising:
   receiving, by the transceiver of the vehicle, a map from the server.

4. The method of claim 1, wherein obtaining the first condition change value of the first path comprises:
   calculating expected driving condition of a first point on the first path and expected driving condition of a second point on the first path;
   sending the expected driving condition of the first point and the expected driving condition of the second point to the server;
   receiving condition change value of the first point and condition change value of the second point from the server; and
   calculating the first condition change value of the first path based on the condition change value of the first point and the condition change value of the second point.

5. The method of claim 1, wherein obtaining the first condition change value of the first path comprises:
   calculating expected driving condition of a first point on the first path and expected driving condition of a second point on the first path;
   receiving old driving condition of the first point and old driving condition of the second point from the server;
   generating condition change value of the first point based on the expected driving condition of the first point and the old driving condition of the first point received from the server;
   generating condition change value of the second point based on the expected driving condition of the second point and the old driving condition of the second point received from the server; and
   calculating the first condition change value of the first path based on the condition change value of the first point and the condition change value of the second point.

6. The method of claim 1, wherein calculating a first distance value between the first path and the trouble area comprises:
   determining a first point and a second point on the first path;
   determining a distance value between the first point and the trouble area and a distance value between the second point and the trouble area;
   determining a smaller value between the distance value between the first point and the trouble area and a distance threshold as a first valid distance value;
   determining a smaller value between the distance value between the second pint and the trouble area and the distance threshold as a second valid distance value; and
   determining the first distance value between the first path and the trouble area based on the first valid distance value and the second valid distance value.

7. The method of claim 1, wherein obtaining, by the processor of the vehicle, an effect value on vehicle driving associated with a change of weather comprises:
   receiving the effect value from the server.

8. The method of claim 1, wherein obtaining, by the processor of the vehicle, an effect value on vehicle driving associated with a change of weather comprises:
   obtaining first weather information at a first time instant and second weather information at a second instant; and
   determining the effect value based on the first weather information and the second weather information.

9. A vehicle, comprising a plurality of wheels, one or more engines, and a control mechanism wherein the control mechanism comprises a non-transitory memory comprising instructions; and a processor in communications with the memory, wherein the processor is configured to execute the instructions to:
   receive information on driving condition of an area from a server, wherein the driving condition indicates that the area comprises a trouble area;
   calculate a first path and a second path from a first point of location to a second point of location based on the driving condition of the area, each path from the first point to the second point;
   obtain a first condition change value of the first path and a second condition change value of the second path, wherein a condition change value for a path represents an amount of reduction in uncertainty of the driving condition of the area based on road condition measurements along the path;

calculate a first distance value indicating a distance between the first path and the trouble area and a second distance value indicating a distance between the second path and the trouble area;

obtain an effect value on vehicle driving associated with a change of weather;

calculate a first weighted value and a second weighted value, the first weighted value based on the first condition change value and the first distance value weighted by and the effect value, the second weighted value based on the second condition change value and the second distance value weighted by effect value, wherein the change of weather to a worse condition for driving a vehicle corresponds to a decrease of a weight by the effect value;

select a path from the first path and the second path based on the first weighted value and the second weighted value, wherein the selected path includes a sequence of vehicle states; and send the sequence of vehicle states to the mechanical system to move the vehicle from the first point to the second point along the selected path.

10. The vehicle of claim 9, wherein the processor is further configured to execute the instructions to:
measure a driving condition of a point on the selected path when the vehicle moves along the selected path; and
send the measured driving condition of the point to the server.

11. The vehicle of claim 9, wherein the processor is further configured to execute the instructions to:
receive a map from the server.

12. The vehicle of claim 9, wherein the processor is further configured to execute the instructions to:
calculate expected driving condition of a first point on the first path and expected driving condition of a second point on the first path;
send the expected driving condition of the first point and the expected driving condition of the second point to the server;
receive condition change value of the first point and condition change value of the second point; and
calculate the first condition change value of the first path based on the condition change value of the first point and the condition change value of the second point.

13. The vehicle of claim 9, wherein the processor is further configured to execute the instructions to:
calculate expected driving condition of a first point on the first path and expected driving condition of a second point on the first path;
receive old driving condition of the first point and old driving condition of the second point from the server;
generate condition change value of the first point based on the expected driving condition of the first point and the old driving condition of the first point received from the server;
generate condition change value of the second point based on the expected driving condition of the second point and the old driving condition of the second point received from the server; and
calculate the first condition change value of the first path based on the condition change value of the first point and the condition change value of the second point.

14. The vehicle of claim 9, wherein the processor is further configured to execute the instructions to:
determine a first point and a second point on the first path;
determine a distance value between the first point and the trouble area and a distance value between the second point and the trouble area;
determine a smaller value between the distance value between the first point and the trouble area and a distance threshold as a first valid distance value;
determine a smaller value between the distance value between the second pint and the trouble area and the distance threshold as a second valid distance value; and
determine the first distance value between the first path and the trouble area based on the first valid distance value and the second valid distance value.

15. The vehicle of claim 9, wherein the processor is further configured to execute the instructions to:
receive the effect value from the server.

16. The vehicle of claim 9, wherein the processor is further configured to execute the instructions to:
obtain first weather information at a first time instant and second weather information at a second instant; and
determine the effect value based on the first weather information and the second weather information.

* * * * *